US005758356A

United States Patent [19]
Hara et al.

[11] Patent Number: 5,758,356
[45] Date of Patent: May 26, 1998

[54] HIGH CONCURRENCY AND RECOVERABLE B-TREE INDEX MANAGEMENT METHOD AND SYSTEM

[75] Inventors: Norihiro Hara, Kawasaki; Nobuo Kawamura, Sagamihara; Junichiro Soshiki, Yokohama, all of Japan

[73] Assignees: Hitachi, Ltd., Tokyo; Hitachi Software Engineering Co., Ltd., Yokohama, both of Japan

[21] Appl. No.: 527,224

[22] Filed: Sep. 12, 1995

[30] Foreign Application Priority Data

Sep. 19, 1994 [JP] Japan .................. 6-222931

[51] Int. Cl.$^6$ .................................................. G06F 7/00
[52] U.S. Cl. ........................ 707/202; 707/2; 707/3; 707/8; 707/9; 707/10; 707/100; 707/201
[58] Field of Search ........................ 395/603, 602, 395/604, 608, 611, 618; 707/202, 201, 100, 10, 9, 8, 2, 3

[56] References Cited

U.S. PATENT DOCUMENTS

| | | | |
|---|---|---|---|
| 4,697,266 | 9/1987 | Finley et al. | 395/182.14 |
| 4,945,474 | 7/1990 | Elliot et al. | 364/200 |
| 5,089,952 | 2/1992 | Bozman | 395/725 |
| 5,095,421 | 3/1992 | Freund | 395/650 |
| 5,123,104 | 6/1992 | Levine et al. | 707/1 |
| 5,175,849 | 12/1992 | Schneider | 395/618 |
| 5,204,958 | 4/1993 | Cheng et al. | 395/600 |
| 5,265,244 | 11/1993 | Ghosh et al. | 395/600 |
| 5,265,245 | 11/1993 | Nordstrom et al. | 395/600 |
| 5,283,894 | 2/1994 | Deran | 395/600 |
| 5,319,773 | 6/1994 | Britton et al. | 395/182.13 |
| 5,319,774 | 6/1994 | Ainsworth et al. | 395/575 |
| 5,333,303 | 7/1994 | Mohan | 395/575 |
| 5,418,947 | 5/1995 | Hsu et al. | 395/600 |
| 5,465,328 | 11/1995 | Dievendorff et al. | 395/182.13 |
| 5,475,837 | 12/1995 | Ishak et al. | 395/600 |
| 5,522,068 | 5/1996 | Berkowitz | 395/600 |
| 5,560,007 | 9/1996 | Thai | 395/600 |
| 5,568,638 | 10/1996 | Hayashi et al. | 395/600 |
| 5,596,710 | 1/1997 | Voigt | 395/182.14 |
| 5,644,763 | 7/1997 | Roy | 707/101 |

OTHER PUBLICATIONS

ARIES: A Transaction Recovery Method Supporting Fine–Granularity Locking and Partial Rollbacks Using Write–Ahead Logging, written by C. Mohan and Don Haderle in ACM Transactions on Database Systems, vol. 17, No. 1, Mar. 1992 pp. 120–131.

Lehman, P., Yao, S.B.: Efficient Locking For Concurrent Operations On B–Trees, ACM Transactions Of Database Systems, vol. 6, No. 4, Dec. 1981, pp. 650–670.

Kwong, Y.S., Wood, D.: A New Method For Concurrency On B–Trees. IEEE Transactions On Software Engineering, No. 3 pp. 211–222, May 1982.

Mohan, C., Levine, F.: ARIES/IM: An Efficient and High Concurrency Index Management Method Using Write–Ahead Logging, ACM–SIGMOD International Conference On Management Of Data, San Diego, Jun. 1992, pp. 371–381.

Primary Examiner—Thomas G. Black
Assistant Examiner—Jean R. Homere
Attorney, Agent, or Firm—Antonelli, Terry, Stout & Kraus, LLP

[57] ABSTRACT

A database management system for accessing the same B-tree index by a plurality of transactions. When a transaction is intercepted at the intermediate stage of an index structure modification process executed by an index structure modification execution unit, the logs of the index structure modification operation at rollback is analyzed by an index structure modification operation log analysis unit. Then, an incomplete index structure change process is completed by an uncompleted index structure modification operation completion and control unit, i.e., the roll-forward operation is performed. In this manner, it is possible to provide an efficient access to the B-tree index wherein even if the tree structure modification operation by one transaction is intercepted at its intermediate stage, another transaction is allowed to access the B-tree index thereafter.

8 Claims, 13 Drawing Sheets 5,758,356

HIGH CONCURRENCY AND RECOVERABLE B-TREE INDEX MANAGEMENT METHOD AND SYSTEM

This application is related to U.S. patent application Ser. No. 08/529,176 filed on Sep. 15, 1995.

BACKGROUND OF THE INVENTION

1. Field of the Invention

The present invention relates generally to a B-tree index management method, and particularly to a management method and system for managing B-tree index linked to a plurality of records stored in a database and managed by a database management system.

2. Description of the Related Art

In a database management system, B-tree index is generally used as one of means for rapidly and efficiently accessing each record in a database. B-tree index has one apex root node and a plurality of nodes divided into branches at a number of hierarchical levels, diverging from the root node. Of the branched nodes, those nodes at the lowest level are often called leaf nodes. Those nodes and other than the leaf nodes are often called upper nodes. The upper nodes include the root node. Each node has a plurality of index entries constituted by the following data. A leaf node entry has a key value and a pointer to the record in the database associated with the key value. An upper entry node has a pointer to a child node at the next lower level and one key value representative of the range of key values covered in the leaf nodes branched from the child node. The key value in an upper index entry functions as a guide (decision element) by which an access program searches in the B-tree index from the root node to the leaf node which has the index entry including the pointer to the target record.

FIG. 15 shows an example of a B-tree index structure. As seen from FIG. 15, key values of index entries in each leaf node are stored in a certain sequence rule of key value. In this example, the index entries are stored in ascending key sequence from left to right in FIG. 15. A child node pointed by a next upper entry stores index entries which have key values smaller than that in the next upper entry.

Problems occur when a plurality of transactions access the same database at a time. Specifically, the conflict can arise when one transaction tries to update a record and at the same time another transaction tries to access the same record. One of the methods to solve the conflict problem is the locking method (exclusive access method). It acquires a lock on the object (record, the whole B-tree index, index node, index entry, key value, etc). With the locking method, a transaction has to acquire a lock on the object before it accesses data. In this case, if another transaction has already acquired the lock out, the former transaction cannot acquire. Although the locking method reliably guarantees the update results or the search results of the transaction, another transaction is required to stand by until the transaction releases its lock. Therefore, in order to improve concurrency (efficiency of concurrent processing) and throughput of the system, it is important to minimize the number of locks one transaction has to acquire at a time and the range of influence of locks.

A typical and important update operation for B-tree index is a split operation which modifies the structure of B-tree index. The split operation is performed if a free area in a node is insufficient and an index entry cannot be inserted into a leaf node. Specifically, with this operation, the index entries in the node, to which a new index entry is inserted, are divided and inserted into a old node and a newly allocated node, and pointers of the old node, the new node, the parent node are set up so as to satisfy the B-tree structure. FIG. 16 shows the B tree structure after the completion of the split operation whereby an index entry with key 6 is inserted in node N5 shown in FIG. 15. Specifically, an index entry with key 6 cannot be inserted into node N5 shown in FIG. 15 because node N5 has not enough space to insert. Therefore, the split operation on node 5 is required to be performed. In this case, node N5 is divided into two nodes (node N5 and new node N51). Since the new node N51 is allocated, a pointer to the new node N51 is required to be inserted to the upper node N2. However, node N2 also has not enough space to insert, the node N2 is divided into two nodes (node N2 and new node N21) like at the leaf level, and the pointer to new node N21 is inserted into node N1. In the above manner, the split operation is completed.

The B-tree index structure modification operation, such as the split operation, updates a link of pointers to index nodes. Therefore, the following two problems occur under a contention condition between the B-tree index structure modification operation and an ordinary (without a index structure modification operation) operation by another transaction. FIG. 17 shows the B-tree structure wherein the split operation divides a leaf node to form a new node. Under this condition, if another transaction Tx2 tries to search key 7, key 7 cannot be found because at this time the pointer to new node N51 is not set up as yet. The second problem is given in the following. If another transaction Tx3 inserts key 4 into node N5 during the split operation, this transaction is intercepted before the completion of the split operation. Therefore, after the nodes under the split operation are recovered, key 4 inserted by the transaction Tx3 is lost. In order to solve these problems, an access by another transaction to the whole index or to the range of influence to be caused by an index structure modification operation is suspended by locking on the whole index or the range of the index structure modification operation method until the completion of the transaction commit or index structure modification operation. This can reduce concurrency.

It is necessary to manage so as to cancel or recover a transaction without losing update results, as described with the second problem of the split operation. Upon occurrence of a transaction failure or system failure, it is necessary for the recovery management of the system to recover data, B-tree index, and other information in the database, on the all-or-nothing property of the transaction.

In order to meet transaction and data recovery guarantee, a database management system is required to record the running transaction informations and the update history of the operations. With them, a database management system makes all the update results of running transactions upon system failure invalid. Specifically, a database management system records the progress of a transaction and its operations which update recoverable data object, in log records stored in a nonvolatile external storage device.

Typical documents regarding B-tree index are enumerated in the following.

Lehman, P., Yao, S. B.: Efficient Locking for Concurrent Operations on B-Trees, ACM Transactions on Database Systems, Vol. 6, No. 4, December 1981.

Kwong, Y. S., Wood, D.: A New Method for Concurrency on B-Trees, IEEE Transactions on Software Engineering, No. 3, pp. 211–222, May 1982.

Mohan, C., Levine, F.: ARIES/IM: An Efficient and High Concurrency Index Management Method Using Write-Ahead Logging, ACM-SIGMOD International Conference on Management of Data, San Diego, June 1992.

In accordance with the paper by Lehman, P. and Yao, S. B., each node has a "link" pointer to a neighboring node at the same level of the tree, and with the pointer an access program can access to the split new node, and therefore the algorithm provides high concurrency. However, this paper does not describe recovery management.

In accordance with the paper by Kwong, Y. S., and Wood, D., the algorithm copies all nodes under the influence of the split operation on the working area, and there completes the split operation and then replaces the copied nodes on the index. With this algorithm, although both the split operation and search process can be concurrently executed, the update operations on the nodes under influence of the split operation can not be executed. Furthermore, since index nodes in the split operation range are copied, a number of pages for storing redundant nodes are required so that a utilization efficiency is lowered. Recovery management is not described therein.

In accordance with the paper by Mohan, C. and Levine, F., it discusses both the recovery method and the concurrent access method including an index structure modification. An access by another transaction to the split operation range is suspended during the split operation, by locking on the whole index as the flag that shows a split operation is running and by the bit flag in each index node which indicates whether the nodes are under the split operation. However, split operations are serialized and the algorithm does not provide the concurrency of a plurality of split operations.

SUMMARY OF THE INVENTION

It is an object of the present invention to provide a high concurrent B-tree index access system multiplicity for a plurality of users.

It is another object of the present invention to provide an efficient access to the B-tree index wherein even if the tree structure modification operation by one user is intercepted at its intermediate stage, another user is allowed to access the B-tree index thereafter.

It is still another object of the invention to provide a method of efficiently using a storage area of B-tree index nodes.

In accordance with one aspect of the present invention, there is provided a B-tree index management system for a database management system to access the same B-tree index by a plurality of transactions, wherein:

one of the plurality of transactions executes an index structure modification operation composed of the update operations on the index nodes by inserting constituent element of the index to each page for data insertion or update, the B-tree management system comprises:

means for recording in a log record informations necessary to complete the index structure modification operation, at the beginning of the index structure modification operation, and recording in a log informations representing a current stage of the index structure modification operation at each step of the index structure modification operation;

means for rolling forward (completing) the unfinished index structure modification operation, the means for rolling forward including analysis means to determine operations necessary to complete the unfinished index structure modification operation when the transaction is intercepted before the index structure modification operation is completed, in accordance with the record corresponding to each process associated with the index structure modification operation and the record corresponding to the beginning of the index structure change operation; and means for rolling back the results of the insertion/deletion operations after completing the unfinished index structure modification operation.

Therefore, both the index structure modification operation and another transaction can be executed at highly concurrently.

In accordance with the invention, if a transaction including a B-tree index structure modification operation is intercepted before the operation is completed, the index management system makes the unfinished index structure modification operation completed without changing back to the original one. Therefore, an access by another transaction to the index nodes under the structure modification operation can be permitted as soon as the index structure modification operation is completed. Accordingly, the multiplicity of concurrent access to the same index by a plurality of transactions can be improved, allowing a high speed access.

DETAILED DESCRIPTION OF THE PREFERRED EMBODIMENTS

Embodiments of the invention will be described with reference to the accompanying drawings.

Figure 18:
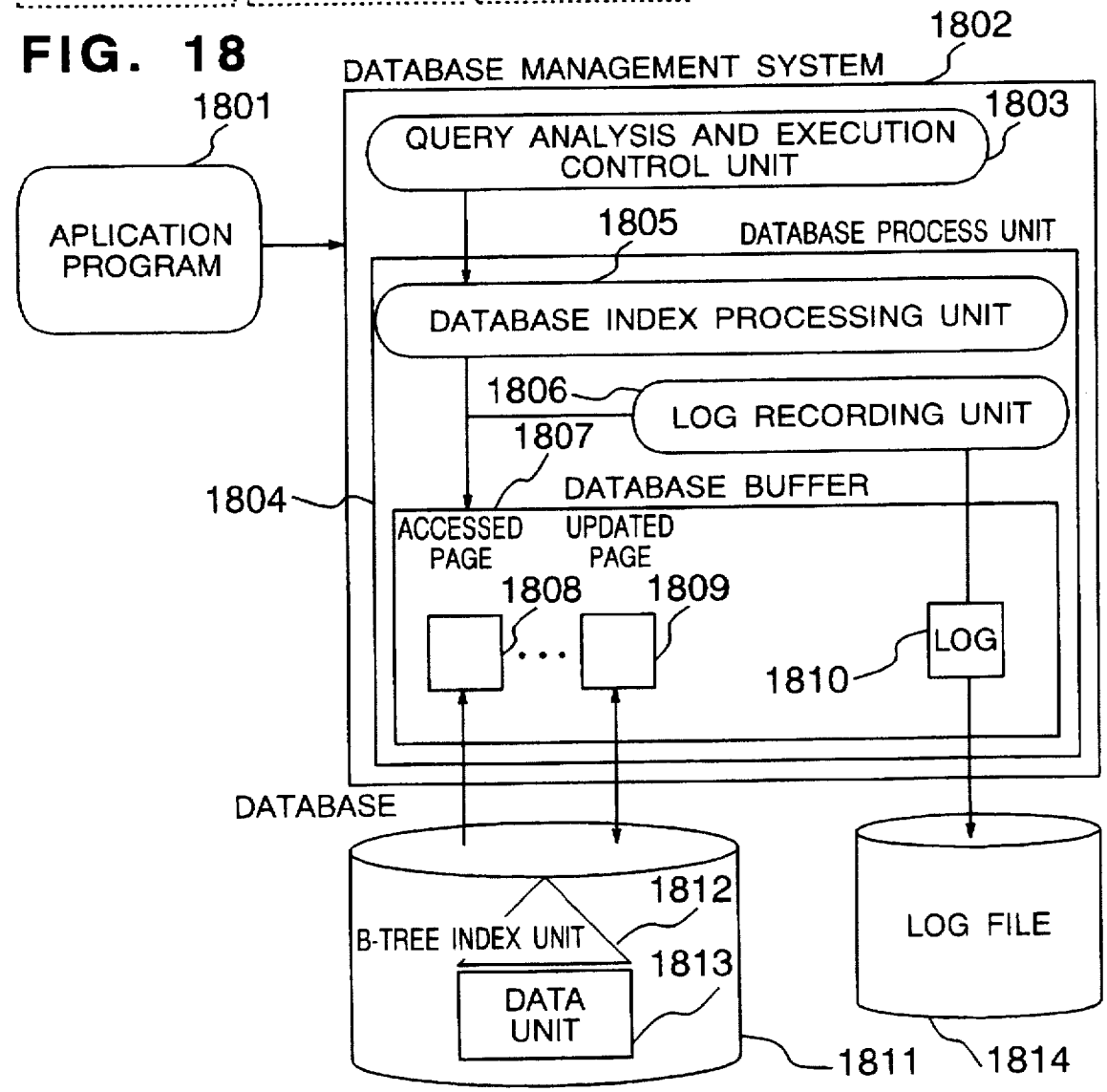
FIG. 18 is a diagram that shows the structure of a database management system.

FIG. 18 shows the structure of a database management system of this invention. As shown, the database management system 1802 is constituted by an analysis and execution control unit 1803 for receiving and analyzing a data access (query) requests from an application program 1801, performing optimization and the like, and controlling the database access, a database process unit 1804 for accessing the data, and database buffers 1807.

A user can search, access, and update a data record stored in a database 1811 at its data unit 1813, by the database management system 1802 through the application program 1801. In order to efficiently access data in the database, the data record is accessed generally by using a B-tree index 1812.

A typical B-tree index structure has at least one node, and in most cases, at one level each node has a plurality of son nodes. The root node is one node at the highest level. An index entry of each node consists of a key and a pointer to a node at the next lower level. The index entry at the lowest level consists of a pointer to the data record with the key in the database. The node at the lowest level is often called a leaf node. Each node of B-tree index is generally realized by a page on the database, the page being an access unit.

The data unit 1813 or B-tree index unit 1812 of the database 1811 can be accessed by reading the requested page in the database buffer 1807. After the data in the page on the buffer is searched, the accessed page on buffer is released. It means the page on the buffer can be potentially be replaced. After the data in the page on the buffer is updated, it is declared that the modified pages on the buffer will be written to the database by putting, and thereafter the used buffer is released. Pages on the buffer are not reflected immediately on the database, but they are written to the database at a certain timing. Pages read in the buffer are latched so that another transaction cannot access them. Although the latch is a kind of lock, it can be acquired in a very short time as compared to the lock, and acquiring and releasing a latch is much cheaper than acquiring and releasing a lock. In this embodiment, an S-latch (Shared latch) is used when an index node is accessed, and an X-latch (exclusive latch) is used when an index node is updated. When the buffer is released, the acquired latch is released to allow another transaction to access the database.

Figure 1:
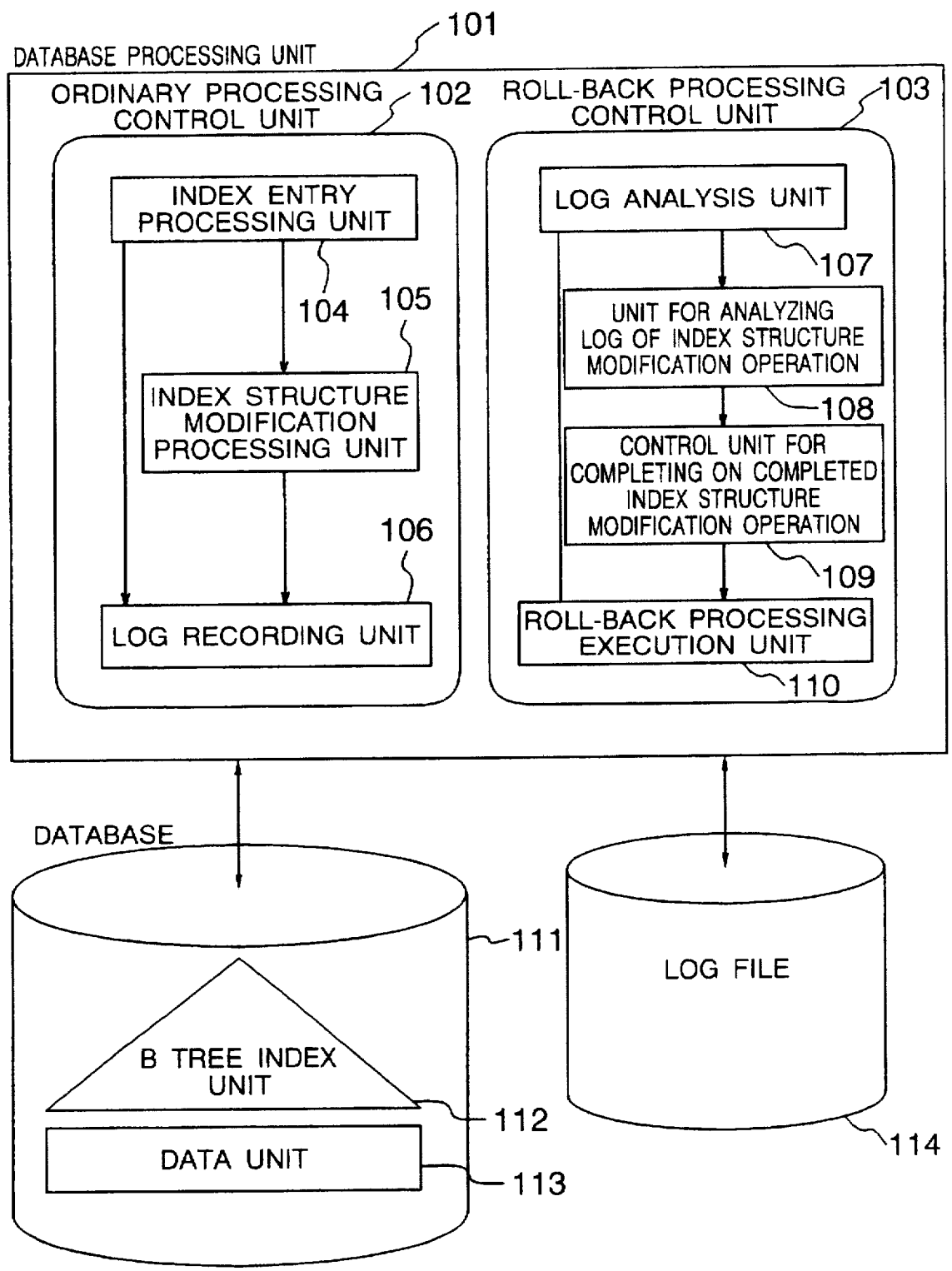
FIG. 1 is a schematic diagram that shows the fundamental structure of a B tree management system of the invention.

FIG. 1 shows the fundamental structure of the database management system of this invention.

The database processing unit 101 described with FIG. 18 is constituted by an ordinary processing control unit 102 to control ordinary index operations, and a rollback processing control unit 103 to cancel the results of the operations made by intercepted transactions.

The ordinary processing control unit 102 is constituted by an index entry operation unit 104, an index structure modification operations unit 105, and a log recording unit 106. The index entry operation unit 104 searches, inserts, and deletes an index entry. The index structure modification operation unit 105 modifies the index structure to keep the balance by a split operation or the like. The log recording unit 106 records a log when data or index is modified, the log being used for maintaining the integrity of the database upon occurrence of various system failures or transaction interceptions.

The rollback processing control unit 103 is constituted by a log analysis unit 107, an index structure modification operation log analysis unit 108, an uncompleted index structure modification operation completion control unit 109, and a rollback processing unit 110. The log analysis unit 107 analyzes logs and determines the rollback operations during roll-back. The index structure modification operation log analysis unit 108 analyzes logs, and if it is determined that the log is the log of an index structure modification operation such as a split operation, analyzes the log to judge whether the index structure modification operation is completed or not. The unfinished index structure modification operation completion and control unit 109 completes an unfinished index structure modification operation which was judged by the index structure modification operation log analysis unit 108 that it is to be completed. The rollback processing unit 110 executes rollback operations to cancel the results of data/index operations in accordance with log information.

For a transaction with B-tree index operations, the index entry processing unit 104 searches from the root node at the highest level to the requested leaf node. For a transaction with B-tree index structure modification operation, the index entry processing unit 104 searches from the root node to the requested leaf node, and thereafter the B-tree index structure modification operation is performed.

In the insertion of an index entry, if the index entry cannot be inserted because of an insufficient free area of the node, the split operation is executed which is the index structure modification operation. The split operation is executed by the index structure modification operation unit 105.

For the index structure modification operation, the log recording unit 106 records a log in the following manner. At the start of the index structure modification operation, a log record is written which contains information necessary to execute (complete) the index structure modification operation. At each step of the index structure modification operation, a log record of the step is written which contains information on the current stage of the index structure modification operation.

When a transaction is intercepted, the log analysis unit 107 of the rollback processing control unit 103 analyzes each of the log records regarding the update operations by the intercepted transaction, the analysis of each log being performed in reverse chronological order. Thereafter, the rollback processing unit 110 executes the rollback operations. In case of an insertion log, the rollback processing unit 110 deletes the inserted index entry in accordance with the informations in the insertion log. In case of a deletion log, the rollback processing unit 11 inserts the deleted index entry in accordance with the informations in the deletion log. The process executes these operations as same as an index entry processing unit 104 executes the ordinary entry operations. The results of the operations in the buffer are lost upon a system failure. In this case, the lost results are recovered from log at restart. The rollback operations at restart can be therefore executed in the same manner as the ordinary rollback operations (at transaction recovery).

If a transaction is intercepted before the index structure modification operation is completed, the index structure modification operation log analysis unit 108 analyzes the log records corresponding to each step of the B-tree index structure and the log records recorded at the beginning of the index structure modification operation, and determines the operations necessary to complete the unfinished the index structure modification operation. The unfinished index structure modification operation completion and control unit 109 completes (rollforward) the unfinished B-tree index structure modification operation.

After the unfinished B-tree index structure modification operation is completed, the rollback processing unit 110 deletes the inserted index entry.

Figure 2:
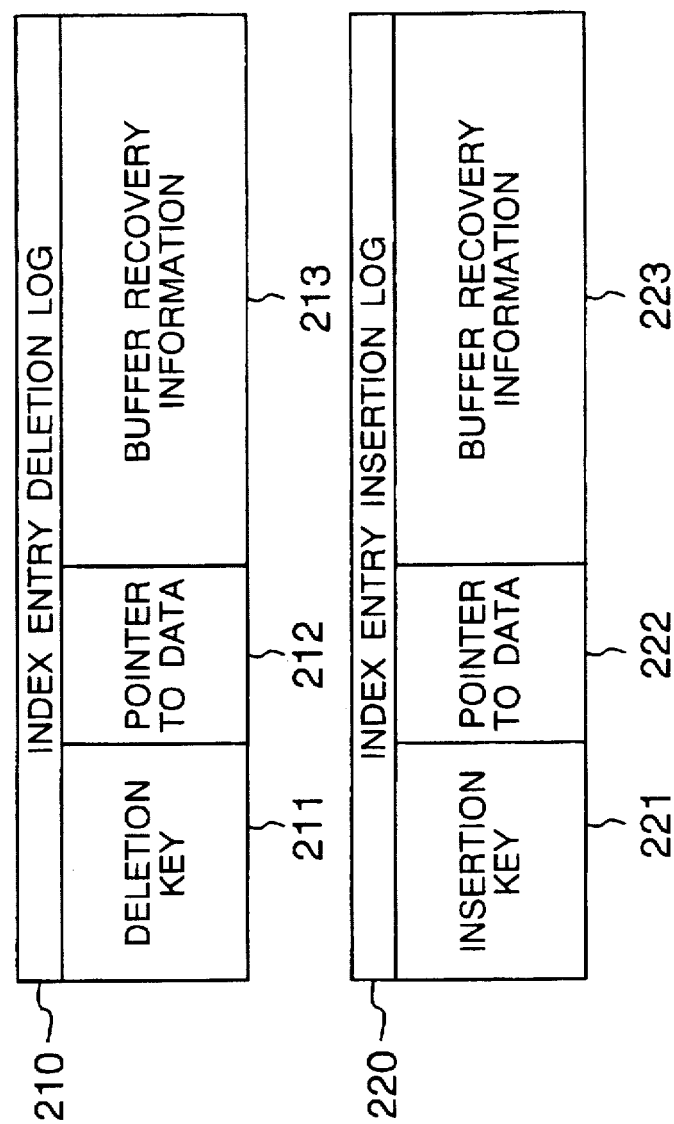
FIG. 2 is a diagram that shows examples of logs recorded by an index update operation in accordance with an embodiment of the invention.

FIG. 2 shows examples of log records of update operations (except the split operations). An index entry deletion log 210 consists of a deletion key 211, a pointer 212 to deletion data, and buffer recovery information 213 which is used for the recovery of the buffer at restart. At restart, the results of update operations in the buffer are recovered and thereafter the only results of running transactions at system failure are rollbacked in the same manner as an ordinary rollback process. An example of buffer recovery information is a physical node image updated. In this case, at a REDO process (buffer recovery process) at restart, the recovery information 213 is physically copied on the buffer. In this way, the buffer can be easily recovered.

Figure 3:
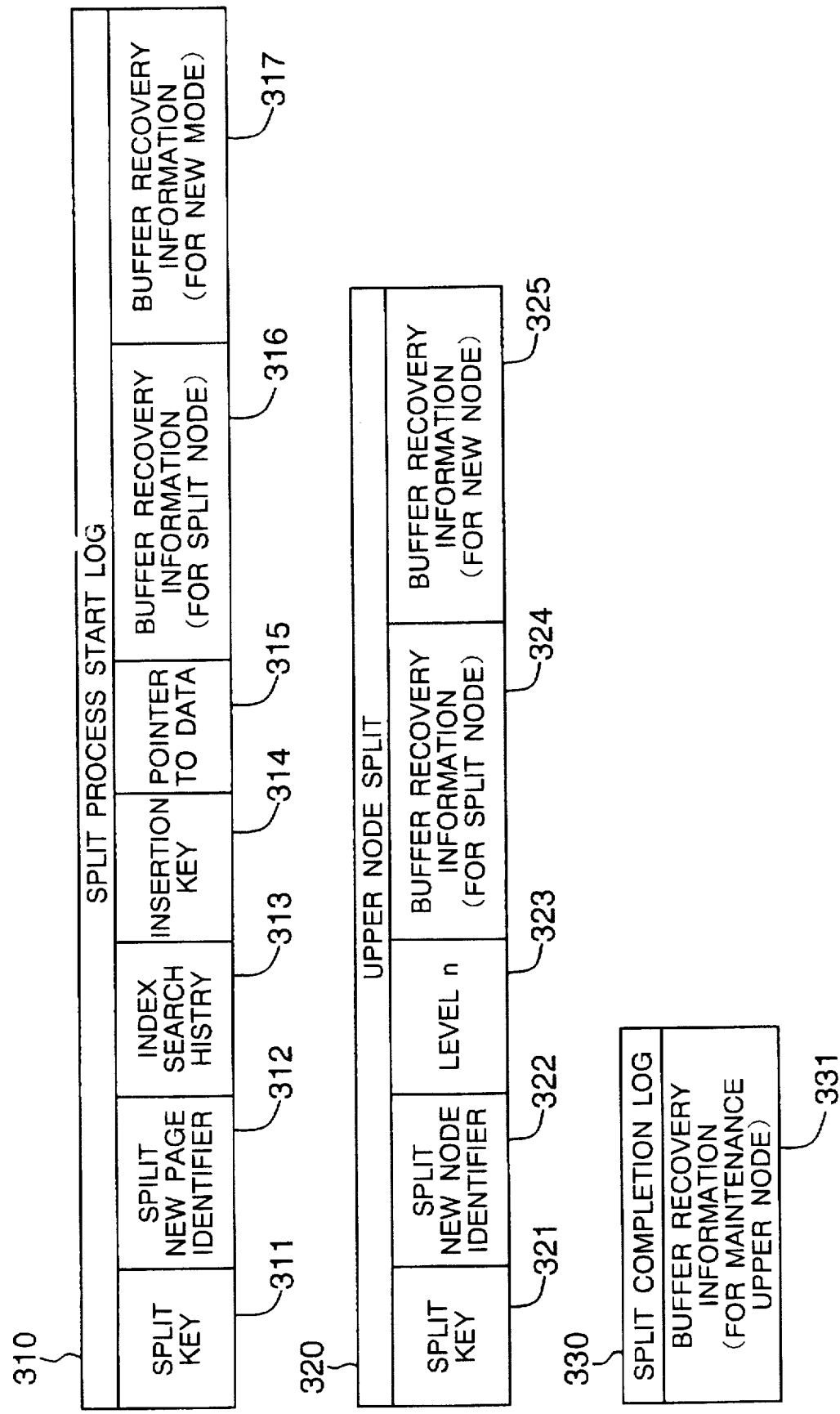
FIG. 3 is a diagram that shows examples of logs recorded by an index structure modification operation in accordance with an embodiment of the invention.

FIG. 3 shows examples of log records to be acquired when the split operation (index structure modification operation) is performed. Log records include a split operation start log 310, an upper node split log 320, and a split completion log 330. The split operation of this embodiment is performed from the leaf node toward the upper node. Specifically, the split operation performs division of a leaf node and insertion of a pointer to new data, then division of the upper node and insertion of a new entry, and then insertion of a new entry into the next upper node. In some case, division of an upper node and insertion of a new entry are not performed. This case corresponds to an index structure modification propagating only to the index level 2. In this embodiment, the leaf node is at the index level 1, and the index level is incremented by 1 toward upper nodes.

A log record for the split operation is recorded at each index level. The split operation start log 310 is recorded when the split operation divides a leaf node and inserts a pointer to a new data. The split operation start log 310 consists of a division key 311, a split new node identifier 312, an index search history 313, an insertion key 314, a pointer 315 to data, a buffer recovery information (for split node) 316, and buffer recovery information (for new node) 317. At transaction recovery or at restart from a system failure, the split operation (index structure modification operation) can be completed by the information contained in the split operation start log 310. The division key 311 and split new node identifier 312 are used to maintain the node at the index level 2 if the split operation is unfinished only at the leaf node level at the transaction interception or at system failure. The index search history 313 composed of the identifiers of the nodes the process searches from root level to leaf level, and is. This information is used to determine the upper node updated for the maintenance process in the split operation, and also to determine the next upper node in an unfinished split completion operation.

The insertion key 314 and pointer 315 to data are information on the insertion index entry which caused the split operation. By using this information, the inserted index entry is deleted when the transaction is intercepted after the split operation is completed, i.e., after the unfinished split completion operation is completed. The buffer recovery information (for split node) 316 and buffer recovery information (for new node) 317 is information to recover the nodes in the buffer at restart from a system failure. At REDO pass (buffer recovery process) after a system failure, the nodes in the buffer can be easily recovered by physically copying the recovery information 316 or 317 of the split operation start log on the nodes in the buffer.

When an upper node is divided and a new entry is inserted, the upper node split log 320 is recorded. This upper node split log 320 contains information on the current stage of the split operation (index structure modification operation) and information necessary to maintain the next upper node. The upper node split log 320 consists of a division key 321, a split new node identifier 322, a level n 323, a buffer recovery information (for split node) 324, and a buffer recovery information (for new node) 325. The division key 321 and split new node identifier 322 are used to maintain the node at the index level n+1 if the split operation is unfinished only at some upper node level n at the transaction interception.

The level n indicates the index level at which the operation associated with this log record was executed. The level n is used to determine the next upper node in the unfinished split completion operation, by using also the index search history 313 in the split operation start log 310. The buffer recovery information (for split node) 234 and buffer recovery information (for new node) 235 is used to recover the nodes in the buffer at restart, like the information 316 and 317.

The split completion log 330 is recorded when the maintenance of the upper node is maintained without a node division, i.e., when the new entry is inserted in the upper node. The split completion log 330 indicates that the split operation is completed. The split completion log 330 contains the buffer recovery information (for maintenance upper node) 331. The buffer recovery information (for maintenance upper node) 331 is information for the recovery of the buffer at restart from a system failure, like the information 316, 317, 324, and 325.

Figure 4:
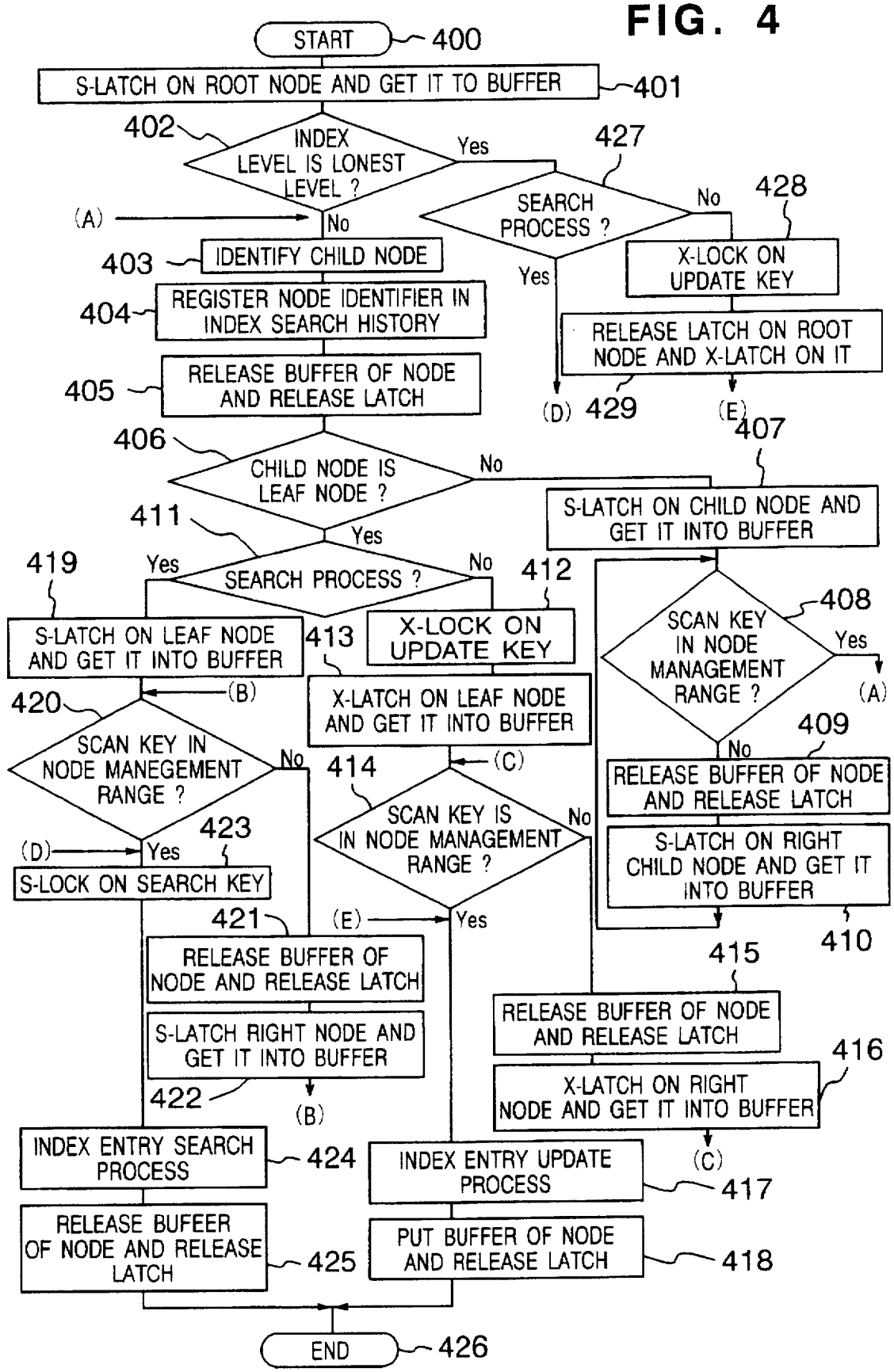
FIG. 4 is a flow chart that shows an algorithm of an ordinary B-tree index operation in accordance with an embodiment of the invention.

FIG. 4 is a flow chart that shows an algorithm of the ordinary process for the B-tree index. As seen from this flow chart, an access program to the B-tree index starts at step 400, and at step 401 the S-latch is acquired on the root node and the node is got to the buffer to access it. This S-latch limits an access to this node by another concurrent user. With this access limit, although another user is given a privilege to access and search the node, other access privileges such as deletion and insertion are not permitted.

In searching index from the root node, it is determined at step 402 from the information in the root page whether the number of the index level is only one, i.e., whether the index has only one node. If the number of level is two or more, the index search is performed toward lower nodes in the following manner. At step 403, a child node is identified by referring to the index entries in the parent node and the search key obtained by analyzing an inquiry request from the application program 1801 shown in FIG. 18. At step 404, a node identifier of a currently accessed node (current node) is registered in the index search history. At step 405, the current node on the buffer is released and the latch is released. It is checked at step 406 whether the child node is a leaf node, by using the information in the parent node and saved before the parent node was released.

Specifically, a node has the index level information. If it is determined at step 406 that the child node is not a leaf node, i.e., if it is determined that the child node is an upper node, an access program searches down to the leaf node by the following steps. At step 407, the S-latch is acquired on the child node and the node is got to the buffer. It is determined at step 408 whether the scan key is in the range of the current node. In the index management system of this embodiment, even if another transaction is performing the split operation, access to nodes is allowed without being restricted by the range of influence to be caused by the split operation. However, because of a contention with the split operation depending on a timing, the scan key may have already been moved to the new node at the right side in the split direction of this embodiment. Such an event is detected at step 408.

If it is detected that the scan key has moved to the right node by the split operation by another transaction, the current node in the buffer is released and the latch is released at step 409. At step 410, the S-latch is acquired on the right child node and the node is got to the buffer. The access program returns to step 408 again to check whether the scan key is in the range of the node. An example of a means to move the key to the right node is a right pointer in the upper node. In this embodiment, an upper node has a right pointer by which an access program move to the right node. If it is determined at step 408 that the scan key is in the range of the current node, the access program goes to step 403 at (A) in FIG. 4 to search the next lower level.

If it is determined at step 406 that the child node is a leaf node, the access program advances to step 411 to check whether the operation is a search operation. If not the search operation, i.e., if the operation is a process of inserting or deleting an index entry or pointer to data, then at step 412 the X-lock is acquired on the update (insertion or deletion) key. The X-lock on the index key is used to limit an access to the index entry with the index key by another transaction, until the current transaction with the X-lock is committed (completed). The lock on the index key is used to assure consistency of data accessed by of transactions. If this consistency is reliably assured, the lock on the index key is not necessary.

As an alternative method of limiting an access to the index entry by another transaction, a lock on the data record may be performed in association with the index entry. After the X-lock is acquired, a similar check to step 408 is performed at step 414. If the scan key is out of the range of the current node, steps 415 and 416 are performed to access the right node, and the access program goes to step 414 to eventually search the update node. If it is determined at step 414 that the current node is the target update node, then the access program advances to step 417 to maintain the index entry and terminate the access program at step 426.

If it is determined at step 411 that the operation is a search operation, the access program advances to step 419 to acquire the S-latch on the leaf node and get it to the buffer. Thereafter, a similar check to step 408 is performed at step 420 to check whether the scan key is out of the range of the current node, steps 421 and 422 are performed to access the right node, and thereafter the access program goes to step 420 to eventually search the search node. If it is determined at step 420 that the current node is the target search node, the access program advances to step 423 to acquire the S-lock on the scan key, and thereafter the search process for the index entry is performed at step 424. Thereafter, at step 425 the node in the buffer is released and the latch is released to terminate the access program at step 426.

If it is determined at step 402 that the index is constituted by only a root page, it is checked at step 427 if the operation is an update operation. If the update operation, the X-lock is acquired on the scan key at step 428, and the S-latch on the root node is released and the X-latch is acquired at on the root node step 429. Thereafter, the access program advances to steps for the leaf page at (D) and (E) in FIG. 4.

Figure 5:
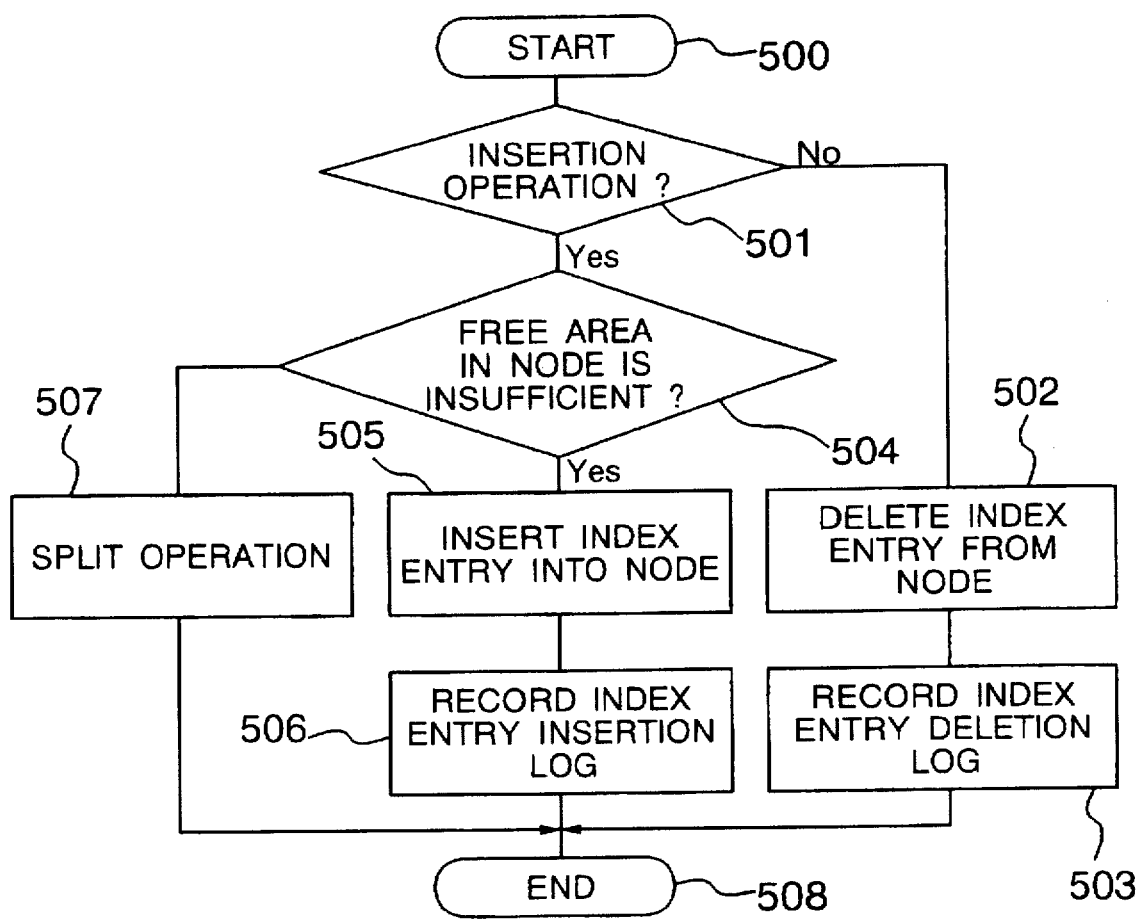
FIG. 5 is a flow chart that shows an algorithm of an index entry update operation in accordance with an embodiment of the invention.

FIG. 5 is a flow chart that shows an algorithm of the index entry update operation. This operation starts at step 500 and it is checked at step 501 whether the update operation is an insertion operation. If not the insertion operation, i.e., if it is the deletion process, the index entry is deleted from the node at step 502, an index deletion log (210 in FIG. 2) is recorded at step 503, and the operation is terminated at step 508. If it is determined at step 501 that the operation is the insertion operation, the process advances to step 504 whereat it is determined whether the free area in the node is insufficient. If it is not insufficient and the index entry can be inserted, the index entry is inserted into the node at step 505, the index entry insertion log (220 in FIG. 2) is recorded at step 506, and the process is terminated at step 508. If it is determined at step 504 that the free area of the node is insufficient, the split operation is performed at step 507 to thereafter terminate the update operation at step 508.

Figure 6:
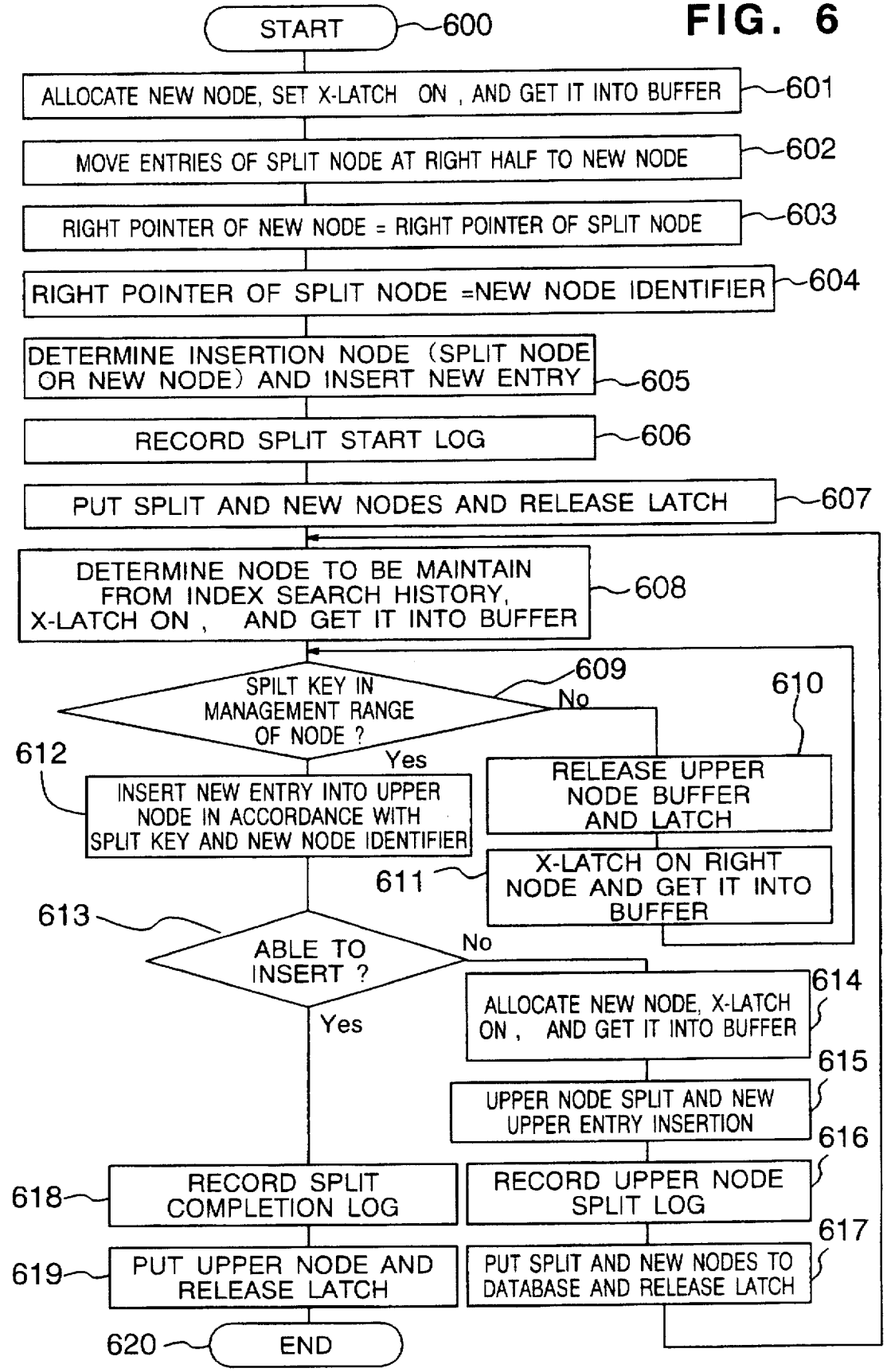
FIG. 6 is a flow chart that shows an algorithm of a B-tree index structure modification operation when an index entry is inserted into a B-tree index in accordance with an embodiment of the invention.
Figure 7:
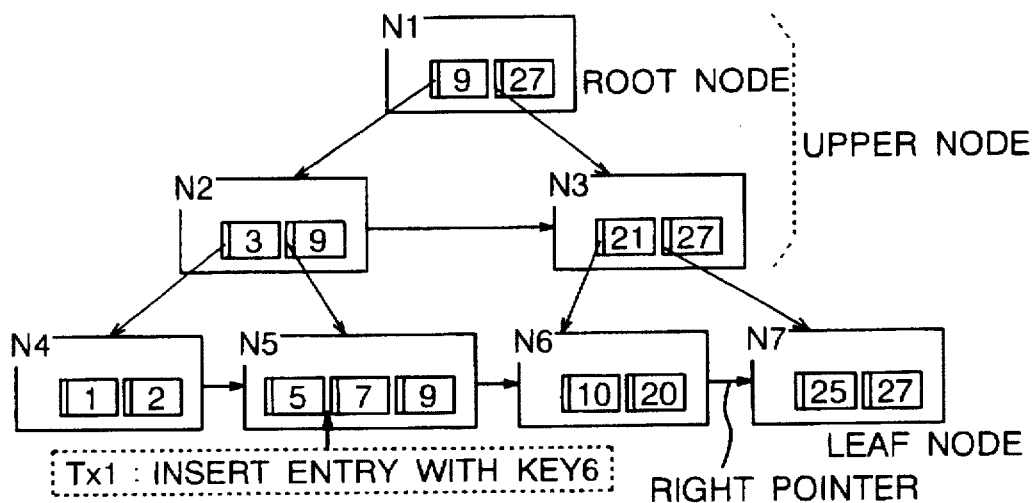
FIG. 7 is a diagram that shows the index structure at the start of a split operation in accordance with an embodiment of the invention.

FIG. 6 is a flow chart that shows an algorithm of the split operation or index structure modification operation. If the free space of a node is insufficient at the index insertion operation at step 417 of FIG. 4, the split operation starts at step 600. As described previously, the split operation begins with division of a leaf node and insertion of a new index entry, and propagates toward upper nodes. The split operation will be described with reference to the flow chart of FIG. 6. FIG. 7 shows the structure of B-tree index at the start of the split operation. In this embodiment, each node of the B-tree index has a "right pointer" to the same level node on the right side as viewed in FIG. 7.

In the split operation, first at step 601, a new node is first allocated to the right of the split node, the X-latch is acquired on the node, and the node is got to the buffer. The reason why the new node is allocated to the right of the split node is as follows. Even if the scan key is moved to the new node by the division, another transaction can access the scan key by the right pointer of the split node without being obstructed by the split. The new node may be allocated to the left of the split node, without any practical problem. In this case, the pointer to the node at the same level is a left pointer instead of the right pointer. It is important that the split direction coincides with the direction of the pointer to the new node. An access by another transaction during the node division operation is limited only during a very short period while the latch during the node division process is held, and an index re-search will not be needed in conflict with the split operation.

Figure 8:
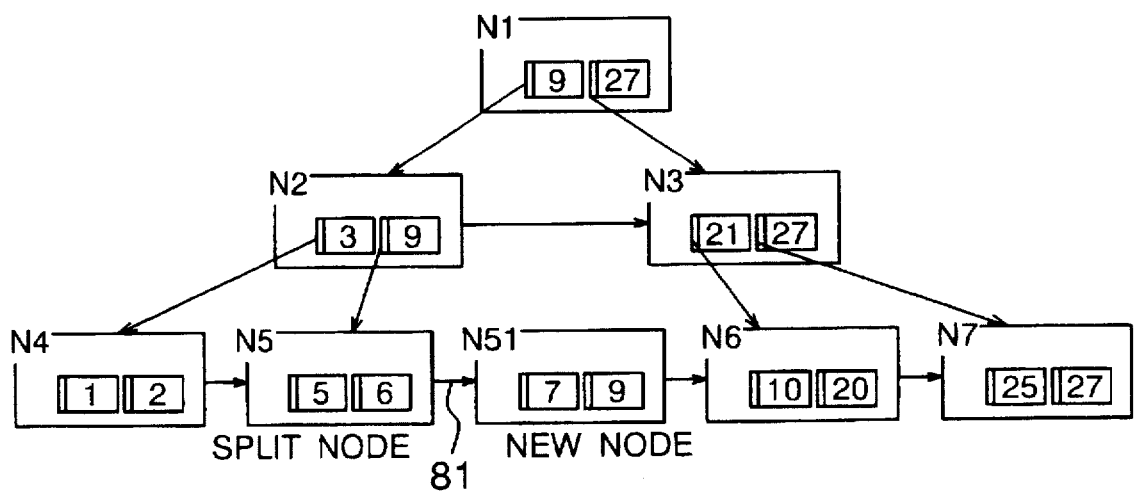
FIG. 8 is a diagram that shows the index structure when a leaf node is divided by the split operation in accordance with the embodiment of the invention.

After the new node is got into the buffer, index entries in the node are divided and a new index entry is inserted at steps 602 to 605. At step 602, entries in the split nodes at the right half are moved to the new node. Thereafter, the right pointers of the split node and new node are set up at steps 603 and 604. At step 605, it is determined which node the new entry is insert into. At step 606, the split start log 310 shown in FIG. 3 is recorded. At step 607, the split node and new node are put to the database and the latch is released to terminate the division process of the leaf node. FIG. 8 shows the structure of the B-tree index after the node division at the leaf level. In this state, the latches on the nodes N5 and N51 have been released so that an access to both the nodes by another transaction can be permitted. As described with the ordinary process in FIG. 4, an access to the new node N51 is performed by routing the right pointer 81. An access to both the nodes is permitted not only to search but also to delete and insert. Execution of the split operation is also permitted.

A propagation process for upper nodes is performed next in the following manner. At step 608, the upper node to maintain is determined from the index search history written when the index search was performed, the X-latch is acquired on the node, and the node is got to the buffer. The upper node contained in the index search history is only a candidate in determining the upper node to maintain, because there is a case wherein the node to maintain has been changed to the right node by the split operation by another transaction. From this reason, after the upper node contained in the index search history is got to the buffer, it is checked at step 609 whether the division key (upper maintenance key) is in the range of the node, like at step 408 of FIG. 4. If out of the range of the node, the right node is accessed at steps 610 and 611 to repeat step 609 and access the node to maintain. If in the range of the node, the process advances to step 612 wherein an upper node insertion entry is formed and entered in accordance with the division key and new node identifier. If it is determined at step 613 that the free area of the upper node is insufficient and the new upper entry cannot be entered, then the following process is performed for an upper node division operation.

Figure 9:
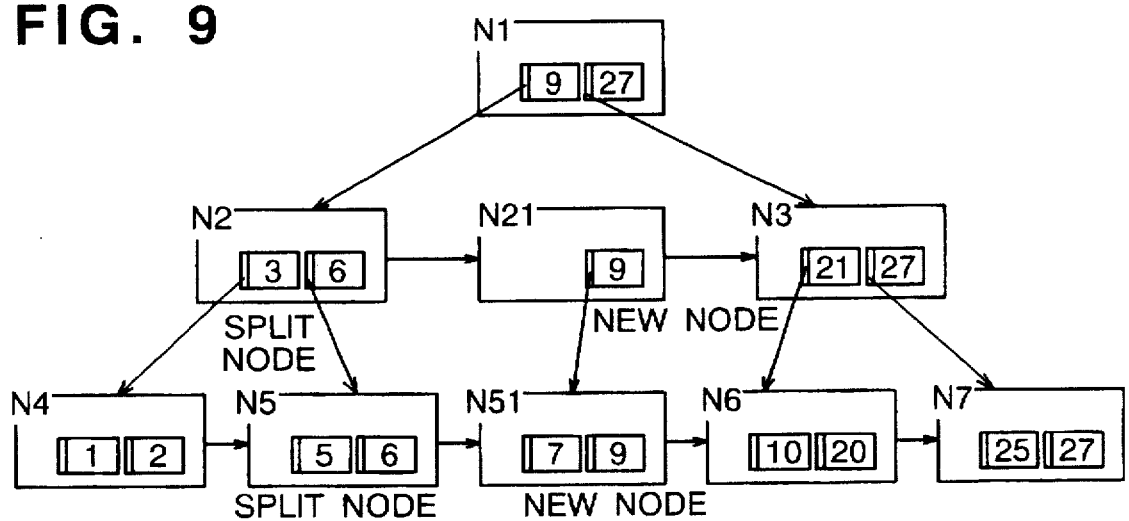
FIG. 9 is a diagram that shows the index structure when an upper node is divided by the split operation in accordance with the embodiment of the invention.

At step 614, a new node is allocated to the right of the split node, the X-latch is acquired on the node, the node is got to the buffer. Thereafter, at step 615 the upper node is divided and a new upper entry is inserted, and at step 616 the upper node split log shown in FIG. 3 is recorded. Thereafter, at step 617 the split node and new node are put to the database and the latch is released to terminate the division operation at the level higher by one level. The process goes to step 608 to maintain of a further upper node. FIG. 9 shows the structure of the B-tree index after the node at the upper level was divided. In this state, the latches on the nodes N2 and N21 have been released so that an access to both the nodes by another transaction can be permitted. As described with the ordinary process in FIG. 4, an access to the new node N21 is performed by routing the right pointer 91.

Figure 10:
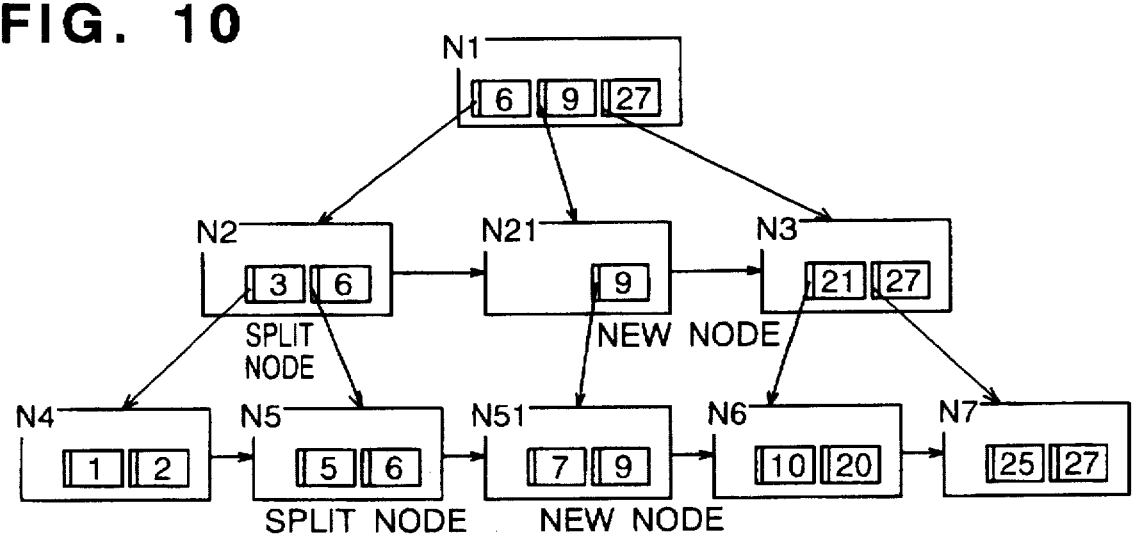
FIG. 10 is a diagram that shows the index structure at the end of the split operation in accordance with the embodiment of the invention.

If the insertion of the new upper entry into the upper node is completed at step 613, then the split operation does not propagate to the next upper level, but the split completion log shown in FIG. 3 is recorded at step 618. The upper node is put to the database and the latch is released at step 619 to complete the split operation at step 620. FIG. 10 shows the structure of the B-tree index at the completion of the split process.

In the split operation of this embodiment, even under the execution of the split process, another transaction can access the range of influence to be caused by the split process. A plurality of split operations can be concurrently executed. Since the direction of latching a plurality of nodes is fixed always from the left to the right, any deadlock between a plurality of split processes is not generated. In the ordinary process, since only one node is latched at a time, any deadlock between the split operation and ordinary operation is free.

Figure 11:
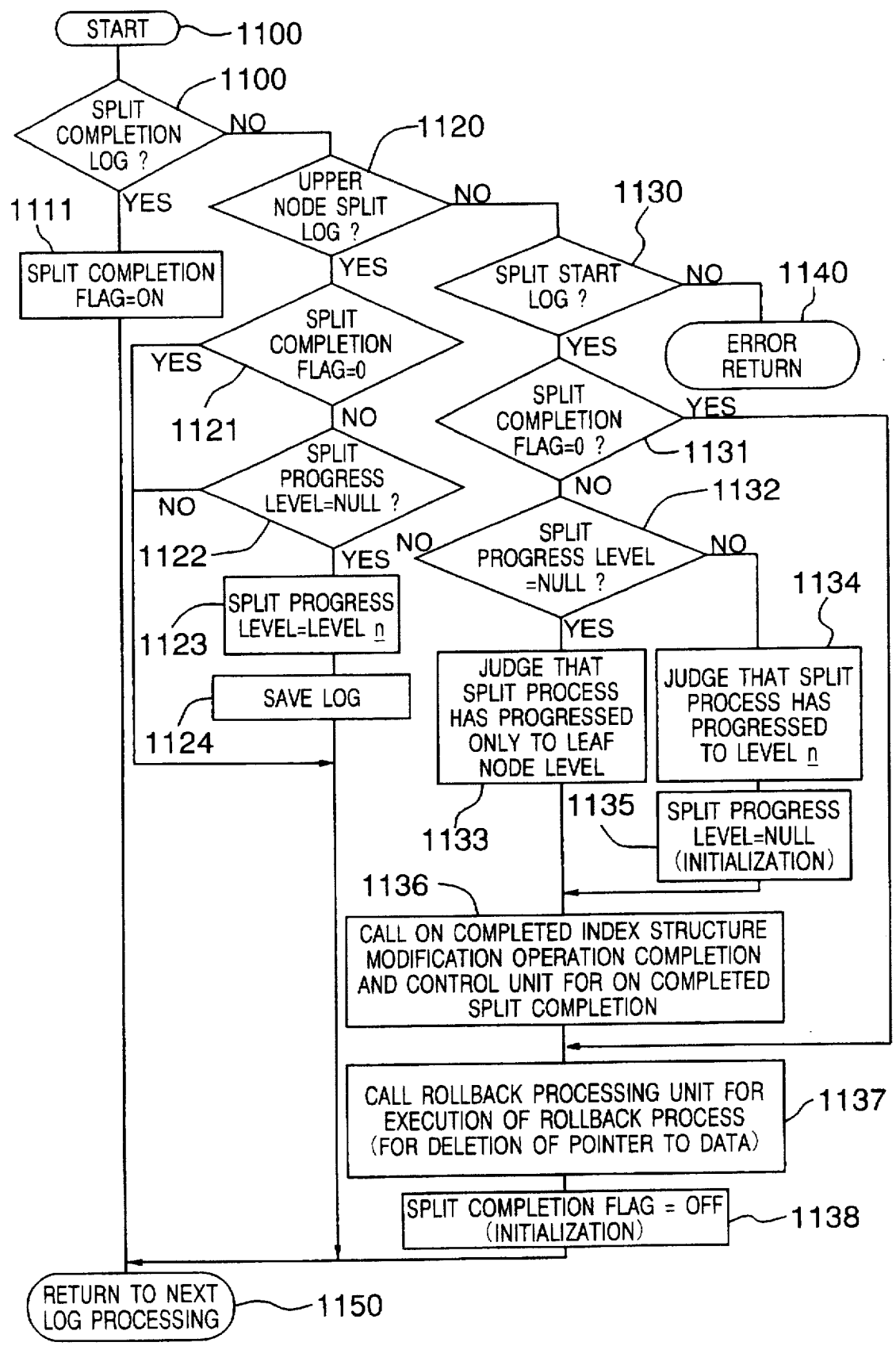
FIG. 11 is a flow chart that shows an algorithm to analysis logs of a index structure modification operation in accordance with an embodiment of the invention.

FIG. 11 is a flow chart that shows an algorithm of the analysis process of analyzing an index structure modification operation log according to an embodiment of the invention. As already described with FIG. 1, if a transaction is intercepted by a user instruction or another factor, the rollback process to cancel the results of update operations by the transaction by the rollback processing control unit 103. Logs recorded during the ordinary data processing are sequentially passed one after another in reverse chronological order, to the log analysis unit 107 for the roll-back process by the roll-back process execution unit 110. A log regarding the index structure modification operation is passed to the index structure modification operation log analysis unit 108 and analyzed for the execution of the unfinished index structure modification operation completion process. If the index structure modification operation is unfinished, the completion process control unit 109 is called. With reference to FIG. 11, the process to be executed by the index structure modification operation log analysis unit 108 will be described.

A log record judged by the log analysis unit 107 to be the index structure modification operation log is passed to the index structure modification operation log analysis unit 108 and analyzed, starting from step 1100. The analysis process is performed divisionally for each of the split process start log 310, upper node split log 320, and split completion log 330, respectively shown in FIG. 3. The unfinished index structure modification operation completion process is called when the split process start log 310 is received.

It is checked at step 1110 whether the received index structure change process log is the split completion log. If it is the split completion log, it is determined that the split operation (index structure modification operation) has been completed, and a split completion flag is turned ON at step 1111. The split completion flag is managed by the index structure modification operation log analysis unit. One split completion flag is provided for each index of the transaction to rollback. The initial value of the split completion flag is "OFF", the value "ON" indicates a completion of the split operation. If the split operation has been completed, the rollback process any operations when the upper node split log or split start log is received after the split completion log.

Since the process of analyzing the split completion log is completed after the split completion flag is turned OFF, the index structure modification operation log analysis unit waits for the next log to be passed from the log analysis unit 107 at step 107.

If the log received at step 1110 is not the split completion log, the process advances to step 1120 to check whether it is the upper node split log. If it is the upper node split log, it is checked at step 1121 whether the split completion flag is ON, i.e., whether the split process has been completed. If the split completion flag is ON, no operation concerning the upper node split log is performed, and the process advances to step 1150 to pass the operation to the log analysis unit 107. If the split completion flag is not ON, i.e., if it is determined that the split process is unfinished, then information representative of the intermediate completion stage of the split operation is temporarily saved, if necessary, for the preparation of the unfinished split completion process. First, it is determined at step 1122 whether a split progress level is "Null".

The split progress level is managed for each index by the index structure modification operation log analysis unit, like the split completion flag. The split progress level indicates to what level the split operation has progressed. As the initial value, "NULL" is set which shows that the split operation has been completed. If the split operation is unfinished, the index level n (323 in FIG. 3) in the first-received upper node split log is set to the split progress level. If the split progress level is NULL at step 1122, it is determined that the transaction was intercepted when the split process progressed to the index level in the upper node split log. Then, at step 1123 the index level n (323 in FIG. 3) in the log is set, at step 1124 the log is temporarily saved as the information necessary to execute the unfinished split operation, and the process advances to step 1150 to pass the operation to the log analysis unit 107. If the split progress level is not NULL, it is determined that the next upper node split log was received and analyzed before the current upper node split log was received, and the process advances to step 1150 to pass the operation to the log analysis unit 107.

If the log received at step 1120 is not the upper node split log, it is determined at step 1130 whether it is the split start log. If it is not the split start log, it is determined that the received log is an invalid log and an error code is returned to the log analysis unit 107 at step 1140. If it is the split start log, like step 1121 it is determined at step 1131 whether the split completion flag is ON, i.e., whether the split operation is completed. If the split completion flag is ON, no operation concerning the upper node split log is performed, and the process advances to step 1150 to pass the operation to the log analysis unit 107.

If the split completion flag is not ON, i.e., if it is determined that the split operation is unfinished, at step 1131 the split progress level is analyzed in the following manner to identify the split operation progress level. If the split progress level is NULL, it is determined at step 1133 that the split operation has progressed only at the leaf node level. The uncompleted index structure modification operation completion and control unit is called to perform the uncompleted split completion process at the index level 2 at step 1136. If the split progress level is not NULL, it is determined at step 1134 that the split operation has progressed to the level n set in the split progress level. Then, the unfinished index structure modification operation completion and control unit is called to perform the unfinished split completion process from the index level n+1 at step 1136. After step 1134, at step 1135, NULL is set to the split progress level to initialize it.

After the unfinished split process is completed, the roll-back processing unit is called at step 1137 to perform the rollback operation and delete the pointer to data at step 1138. To delete the pointer to data, the insertion key 314 and pointer 315 to data in the split start log 310 are used. The processes for the deletion operation such as identification (search) of the leaf node can be easily realized by the same ordinary processes for the B-tree index shown in FIG. 4. If the leaf node identifier for the deletion node is stored in the split start log, a search operation from the index root node is not need so that the rollback operation can be performed more efficiently. After the pointer to data is deleted, OFF is set to the split completion flag to initialize it at step 1138, and the process advances to step 1150 to pass the operation to the log analysis unit 107.

Figure 12:
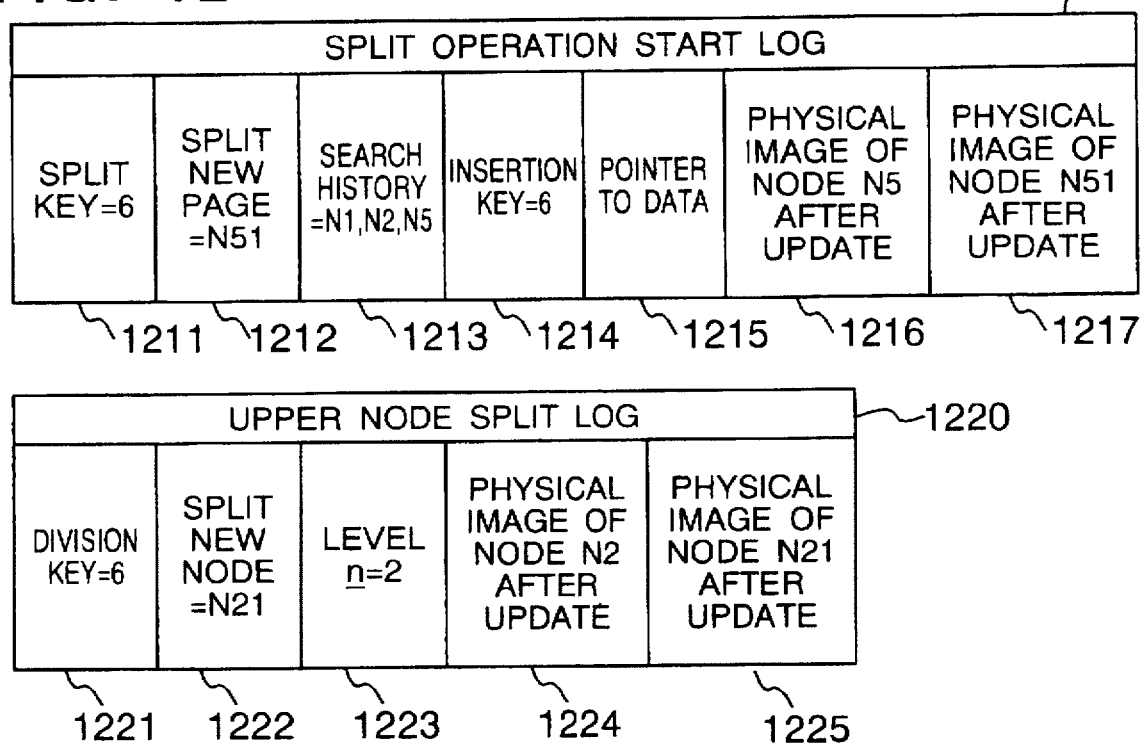
FIG. 12 is a diagram that shows examples of logs associated with the split operation.
Figure 13:
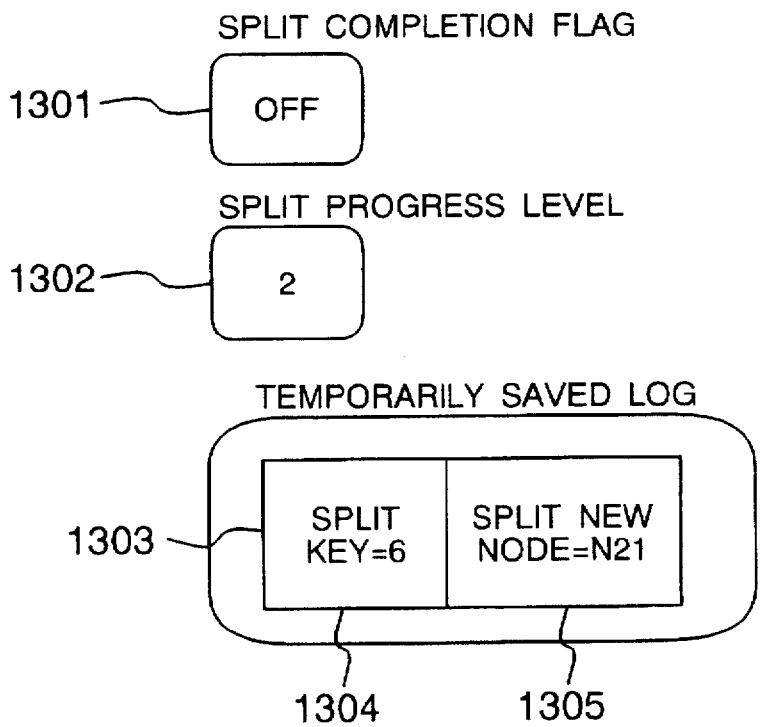
FIG. 13 is a diagram that shows examples of data in an index structure change process log analysis unit.

FIG. 12 shows logs concerning the split operation described with FIGS. 7 to 10, the logs already recorded upon occurrence of a transaction interception in the state shown in FIG. 9. FIG. 13 shows the state of flag and the like before the index structure change operation log analysis unit 108 is called for the unfinished split completion operation.

Figure 14:
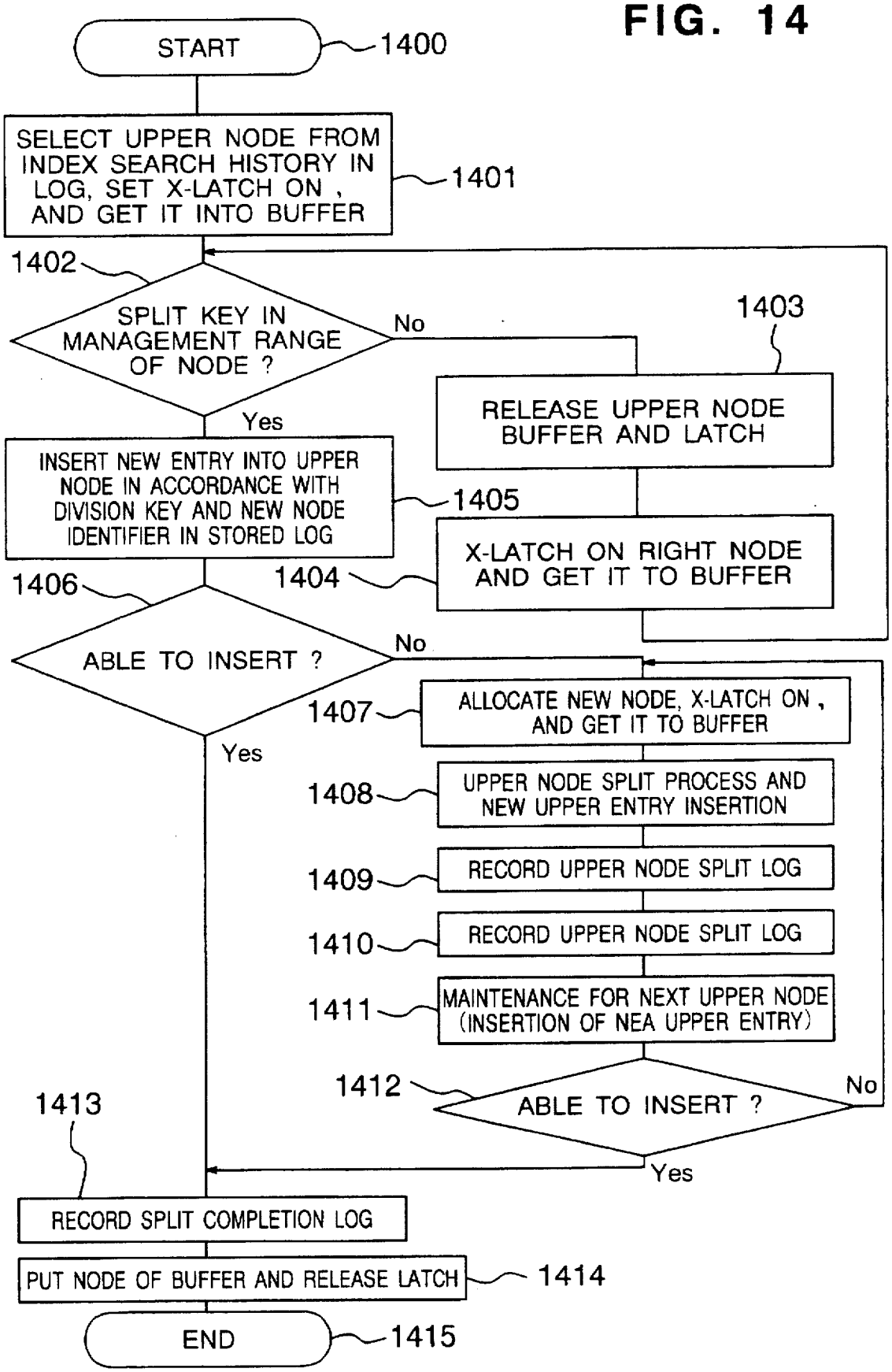
FIG. 14 is a flow chart that shows an algorithm to complete a unfinished B-tree index structure modification operation by roll-back.
Figure 15:
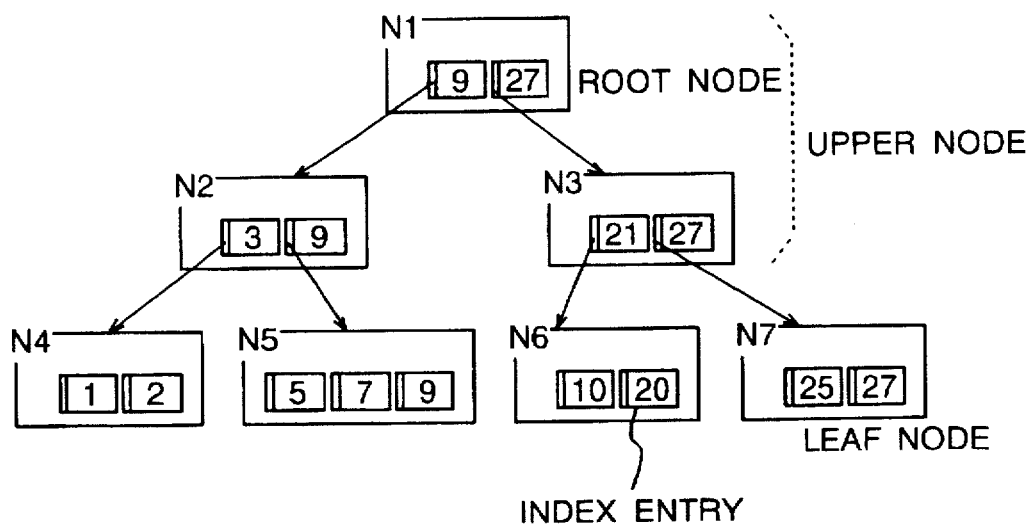
FIG. 15 is a diagram that shows the structure of B-tree index.
Figure 16:
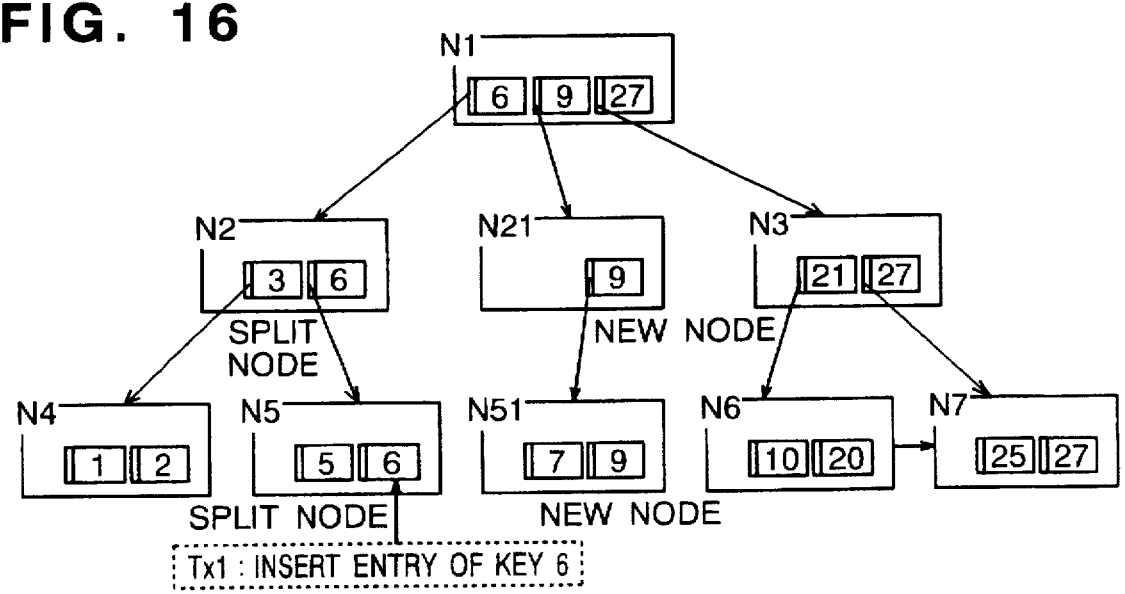
FIG. 16 is a diagram that shows the structure of the B-tree index shown in FIG. 15 after the split operation.
Figure 17:
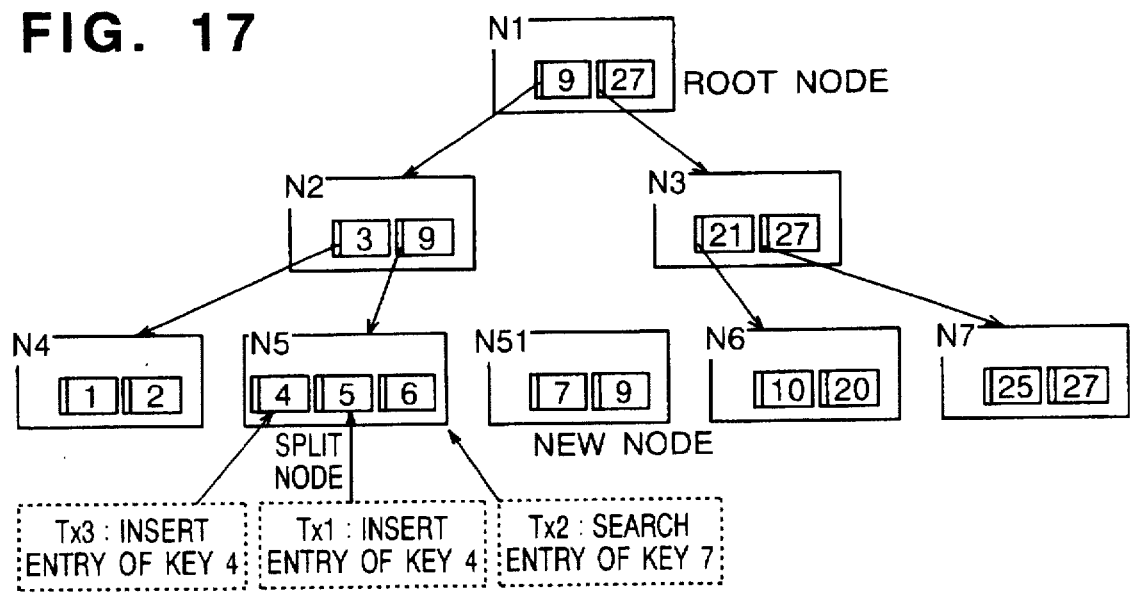
FIG. 17 is a diagram that shows the structure of the B-tree index shown in FIG. 15 during the split operation.

FIG. 14 is a flow chart that shows an algorithm of the unfinished split completion process. The unfinished split completion process is performed starting from step 1400 in the following manner, by using the split process progress level identified by the index structure modification operation log analysis unit and the log stored in this unit as described with FIG. 11. At step 1401 the upper node from which the unfinished split completion process starts is determined by using the split process progress level (index level n or index level 1) identified by the index structure modification operation log analysis unit and the index search history in the split start log. This upper node is only a candidate for the maintenance node.

Similar to the ordinary split operation described with FIG. 6, it is checked at step 1402 whether the insertion key is in the range of the node. If the current upper node is not the node, to update i.e., if the insertion key is not in the range of the node, the node to update is searched at steps 1403 and 1404 by routing the right node. If the insertion key is out of the range of the node at step 1402, the process advances to step 1405 to maintain the upper node. A new entry is formed at step 1405 in accordance with the division key (insertion key) and new node identifier in the log record, and inserted into the upper node. If it is determined at step 1406 that the free area of the upper node is insufficient and the new upper entry cannot be entered, the division operation of the upper node is performed in the following manner.

First, at step 1407, a new node is allocated to the right of the division node, the X-latch is acquired on the node, and the node got to the buffer. Next, the upper node split operation is performed at step 1408 to insert a new upper entry. Similar to the ordinary split operation, at step 1409 the upper node split log is recorded, and at step 1410 the split node and new node are put to the database and the latch is released. At step 1411 the maintenance (insertion of the new upper entry) of the next upper node is performed, and if being able to insert at step 1412, it means a completion of the split process, and so the process advances to step 1413. If not being able to insert because of an insufficient free area of the upper node, the process goes to step 1407 to propagate the split operation to the next upper node.

If the new entry can be inserted into the upper node at step 1406, it means a completion of the split operation, and so the process advances to step 1413 whereat the split completion log is recorded. At step 1414 the buffer of the upper node is put to the database and the latch is released to complete the unfinished split completion process.

The unfinished split completion process when a transaction is intercepted during the split operation in FIG. 9 will be described in detail. As described previously, the unfinished split completion process is performed when the split start log 1210 is received. Since the split progress level is 2, the node N1 at the index level 3 (=2+1) is selected from the index search history 1213 of the split start log 1210 to determine it to be the node to update (upper node from which the unfinished split completion process starts), and the X-latch is acquired on the node and the node is get to the buffer. Since the key temporarily saved is in the range of the node N1, the maintenance for the node N1 is performed by using the key 6 and the pointer to the split new node N21 temporarily saved. The split completion log is recorded, the node in the buffer is put to the database, and the latch is released to complete the split operation (the state shown in FIG. 10).

As above, the unfinished split completion process in the roll-back process can be performed in the manner similar to the ordinary split operation. Accordingly, similar to the ordinary split process, it is possible for another transaction to access the range of influence to be caused by the unfinished split completion process.

According to the present invention, the X-latch on the index node under the index structure modification operation is released as soon as the node is updated. Therefore, another transaction can access the node with the shortest wait. Furthermore, even if the transaction is intercepted during the index structure modification operation, the node once updated is guaranteed as it is. Therefore, the update result of the node by another transaction is not lost. Specifically, even if the transaction is intercepted during the index structure modification operation, the rollback process of one transaction does not adversely affect at all the access to the index by another transaction, thereby dispensing with a re-search of the index and avoiding an access limitation. Accordingly, the high concurrent access to a B-tree index at a time can be provided for a plurality of transactions and a high system throughput can be achieved.

Furthermore, as opposed to one of the conventional techniques, the index structure modification operation is not performed by allocating redundant index storage pages (nodes). Therefore, B-tree index nodes can be used efficiently.

What is claimed is:

1. A B-tree index management system for a database management system to access the same B-tree index by a plurality of transactions, wherein:

when one of the plurality of transactions executes an index structure modification operation, including the update operations on a plurality of B-tree index nodes, by inserting an index constituent element to the page for data insertion or update, if said transaction is intercepted before said index structure modification operation is completed, said index structure modification operation still not completed is made complete and rolled back to guarantee the update result by another transaction made to the nodes associated with said index structure modification operation.

2. A B-tree management system according to claim 1, wherein an access restriction, against another process to the page associated with said index structure modification operation, is released as soon as the node is updated by said index structure modification operation.

3. A B-tree index management system for a database management system to access the same B-tree index by a plurality of transactions, wherein:

when one of the plurality of transactions executes an index structure modification operation, including the update operations on a plurality of B-tree index nodes, by inserting an index constituent element to the page for data insertion or update, said B-tree management system comprises:

means for writing a record including information necessary to execute said index structure modification operation, at the start of said index structure modification operation, and writing a record representing the current stage of said index structure modification operation when each process constituting said index structure modification operation is executed;

means for rolling forward said index structure modification operation, said means for rolling forward including analysis means for determining operations necessary to complete said index structure modification operation when said one transaction is intercepted before said index structure modification operation is completed, in accordance with said records corresponding to said each operation associated with said index structure modification operation and said record corresponding to said start of said index structure modification operation; and means for rolling back a process for an index constituent element inserted or deleted after rolling forward said index structure modification operation.

4. A method for accessing a B-tree index wherein an index structure modification operation updates a plurality of B-tree index nodes by inserting an index constituent element to the page of the data insertion or update said method comprising the steps of:

writing a record including information necessary to execute said index structure modification operation, at the start of said index structure modification operation; and writing a record representing the current stage of said index structure modification operation when each process constituting said index structure modification operation is executed;

rolling forward said index structure modification operation, including analysis for determining operations necessary to complete said index structure modification operation when said one transaction is intercepted before said index structure modification operation is completed, in accordance with said records corresponding to said each operation or associated with said index structure modification operation and said record corresponding to said start of said index structure modification operation; and rolling back a process for an index constituent element inserted or deleted after rolling forward said index structure modification operation.

5. A method of accessing a B-tree index according to claim 4, comprising the further step of releasing an access restriction, against another process to the page associated with said index structure modification operation, as soon as the node is updated by said index structure modification operation.

6. A fault recovery B-tree index management method of recovering an access fault which occurs during an index structure modification operation and a database management system to access the same B-tree index by a plurality of transactions, wherein the method comprises the steps of when one of the plurality of transactions executes an index structure modification operation including the update operations on a plurality of B-tree index nodes, inserting an index constituent element to the page for data insertion or update, when said transaction is intercepted before a B-tree index structure modification operation is completed, completing the index structure modification operation using roll forward log records taken for the period of the structure index structure modification operation and then rolling back an insertion key to gauruntee the update result by another transaction made to nodes associated with the index structure modification operation.

7. A fault recovery B-tree index management method according to claim 6, wherein said data base management system currently acts as the B-tree index with during the index structure modification operation.

8. A fault recovery B-tree index management method according to claim 6, wherein an access restriction, against another process to the page associated with said index structure modification operation, is released as soon as the note is updated by said index structure modification operation.

* * * * *